United States Patent
Feng et al.

(10) Patent No.: US 12,373,407 B2
(45) Date of Patent: Jul. 29, 2025

(54) METHOD, APPARATUS AND ELECTRONIC DEVICE FOR DETECTING DATA ANOMALIES, AND READABLE STORAGE MEDIUM

(71) Applicant: Siemens Aktiengesellschaft, Munich (DE)

(72) Inventors: Cheng Feng, Hangzhou (CN); Ying Qu, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/466,528

(22) Filed: Sep. 13, 2023

(65) Prior Publication Data
US 2024/0104072 A1    Mar. 28, 2024

(30) Foreign Application Priority Data
Sep. 19, 2022    (CN) .......................... 202211140578.8

(51) Int. Cl.
*G06F 16/20* (2019.01)
*G06F 16/215* (2019.01)

(52) U.S. Cl.
CPC ................. *G06F 16/215* (2019.01)

(58) Field of Classification Search
CPC ........ G06F 16/215; G06N 5/01; G06N 5/025; G06N 5/046; G06N 20/00
See application file for complete search history.

(56) References Cited

U.S. PATENT DOCUMENTS

| | | | |
|---|---|---|---|
| 2022/0044133 A1* | 2/2022 | Otto ........................ | G06N 5/04 |
| 2022/0382736 A1* | 12/2022 | Beilis ..................... | G06N 3/045 |
| 2023/0185782 A1* | 6/2023 | Kumolu ................ | G06F 16/285 |
| | | | 707/692 |
| 2024/0045411 A1* | 2/2024 | Feng ................... | G05B 23/0254 |

FOREIGN PATENT DOCUMENTS

EP        3913882 A1 * 11/2021 ........... G06F 40/194

OTHER PUBLICATIONS

Article entitled "Early Anomaly Detection in Smart Home: A Casual Association Rule-Based Approach", by Sfar et al., dated 2018 (Year: 2018).*

(Continued)

*Primary Examiner* — Mahesh H Dwivedi
(74) *Attorney, Agent, or Firm* — Slayden Grubert Beard PLLC (57) ABSTRACT

Various embodiments of the teachings herein include a method for detecting data anomalies. A method may include: receiving test data; and matching the test data with a data rule determined on the basis of historical data having a shared data type with the test data. The data rule contains an antecedent and a consequent predicate set. An intersection of the antecedent predicate set and the consequent predicate set is an empty set. The antecedent predicate set contains at least one antecedent predicate. The consequent predicate set contains at least one consequent predicate. When the data to be tested satisfies all the antecedent predicates in the antecedent predicate set and fails to satisfy at least one consequent predicate in the consequent predicate set, the test data is flagged as anomalous due to failure to satisfy the data rule.

9 Claims, 4 Drawing Sheets (56) References Cited

OTHER PUBLICATIONS

Feng, Cheng et al., "A Systematic Framework to Generate Invariants for Anomaly Detection in Industrial Control Systems," Proceedings 2019 Network and Distributed System Security Symposium, URL: https://www.ndss-symposium.org/wp-content/uploads/2019/02/ndss2019_07A-3_Feng_paper.pdf, 15 pages, Jan. 1, 2019.
Extended European Search Report, Application No. 23197462.7, 11 pages, Feb. 14, 2024.

* cited by examiner

METHOD, APPARATUS AND ELECTRONIC DEVICE FOR DETECTING DATA ANOMALIES, AND READABLE STORAGE MEDIUM

CROSS-REFERENCE TO RELATED APPLICATIONS

This application claims priority to CN Application No. 202211140578.8 filed Sep. 19, 2022, the contents of which are hereby incorporated by reference in their entirety.

TECHNICAL FIELD

The present disclosure relates to the field of data processing technology. Various embodiments include methods, apparatus, and/or electronic devices for detecting data anomalies.

BACKGROUND

Data mining is the process of searching, by an algorithm, for information hidden in a large amount of data. Anomaly detection, intended to identify data instances that do not conform to expected behaviour, is a classic data mining task widely applied in various fields such as system health monitoring, intrusion detection, anti-money laundering, and social media analysis.

At present, many methods have been proposed to solve the problem of how to detect data anomalies in different application fields. Commonly used models include One-Class Support Vector Machine (OC-SVM), isolation forest, Local Outlier Factor (LOF), deep anomaly detection model based on automatic encoders, and generative adversarial networks.

However, most existing research, especially research on deep neural networks, focuses on detection tasks, overlooking underlying models and the interpretability of anomalies detected thereby. In fact, anomaly interpretation (aimed at explaining why specific data instances are detected as anomalies) is an equally important (or even more important) task in many practical applications. For example, when the health monitoring system of critical equipment in a factory reports an anomaly, a human expert needs a direct clue as to why the data instance is identified as anomalous, and then decides on the specific steps to be taken next, such as ignoring the anomaly, making a model adjustment, identifying the fault, carrying out predictive maintenance, and shutting down the system.

SUMMARY

As an example, some embodiments of the teachings herein include a method for detecting data anomalies, comprising: receiving data to be tested; matching the data to be tested with a data rule determined on the basis of historical data, the historical data having the same data type as the data to be tested, the data rule containing an antecedent predicate set and a consequent predicate set, wherein the intersection of the antecedent predicate set and the consequent predicate set is an empty set, the antecedent predicate set contains at least one antecedent predicate, and the consequent predicate set contains at least one consequent predicate; and when the data to be tested satisfies all the antecedent predicates in the antecedent predicate set and fails to satisfy at least one consequent predicate in the consequent predicate set, determining that the data to be tested is anomalous due to failure to satisfy the data rule.

The teachings of the present disclosure provide data anomalies may be detected accurately, and reasons for the occurrence of anomalies are interpretable.

In some embodiments, the method further comprises: determining a global predicate set on the basis of the historical data; determining a predicate set of predicates in the global predicate set that the historical data conforms to; determining a closed frequent predicate set from the predicate set; dividing the closed frequent predicate set into the antecedent predicate set and the consequent predicate set; and grouping the antecedent predicate set and the consequent predicate set into the data rule. Therefore, use of historical data facilitates the determination of a data rule.

In some embodiments, dividing of the closed frequent predicate set into the antecedent predicate set and the consequent predicate set comprises: randomly dividing the closed frequent predicate set into a first set and a second set, wherein both the first set and the second set are non-empty sets; when the support for the first set is equal to the support for the closed frequent predicate set, determining the first set to be the antecedent predicate set and determining the second set to be the consequent predicate set. A support operation based on a division of a closed frequent predicate set facilitates the determination of an antecedent predicate set and a consequent predicate set.

In some embodiments, the method further comprises: screening out the data rule that meets a constraint condition, the constraint condition being: $\sigma(S) > \max(\theta, \gamma^* \min(\sigma(p_1), \ldots, \sigma(p_{|S|})))$; $S_1$ is the antecedent predicate set; $S_2$ is the consequent predicate set; $S=S_1 \cup S_2$; $\{p_1, \ldots, p_{|S|}\}$ are the predicates in S; $\theta \in (0, \gamma)$; $\cup$ is a union operation; $\sigma$ is a support calculation; min is a minimisation operation; max is a maximisation operation; * is a multiplication operation; $\theta$ and $\gamma$ are preset coefficients. This may further ensure the statistical significance of a data rule.

In some embodiments, the historical data contains a discrete variable; said determining of a global predicate set on the basis of historical data comprises: generating corresponding candidate predicates on the basis of each possible value of the discrete variable; adding a candidate predicate with support greater than or equal to a predetermined threshold to the global predicate set; adding a candidate predicate with support less than the threshold to a temporary predicate set; adding a combination predicate with support greater than or equal to the threshold among the combination predicates formed by an OR relationship between predicates in the temporary predicate set to the global predicate set. Predicates may be quickly and automatically generated for historical data containing discrete variables.

In some embodiments, the historical data contains a discrete variable and a continuous variable; said determining a global predicate set on the basis of historical data comprises: generating corresponding candidate predicates on the basis of each possible value of the discrete variable; adding a candidate predicate with support greater than or equal to a predetermined threshold to the global predicate set; adding a candidate predicate with support less than the threshold to a temporary predicate set; adding a combination predicate with support greater than or equal to the threshold among the combination predicates formed by an OR relationship between predicates in the temporary predicate set to the global predicate set; traversing the discrete variables, wherein a decision tree classification model is trained for the traversed discrete variables, the input variables in the decision tree classification model are all the continuous variables, and the output variables of the decision tree classification model are the traversed discrete variables; traversing the continuous variables, wherein a decision tree regression model is trained for the traversed continuous variables, wherein the input variables in the decision tree regression model are all the continuous variables other than the traversed continuous variables, and the output variables of the decision tree regression model are the traversed continuous variables; for each continuous variable, extracting the cut-off values used by the non-leaf nodes of all the decision tree classification models and of all the decision tree regression models that are related to the continuous variable; for each continuous variable, sorting the cut-off values of the extracted continuous variables; generating a predicate set for each continuous variable on the basis of the sorting results of each continuous variable; and adding a predicate set of all the continuous variables to the global predicate set. Predicates may be quickly and automatically generated for historical data containing discrete variables and continuous variables.

As another example, some embodiments include an apparatus for detecting data anomalies, comprising: a receiving module configured to receive data to be tested; a matching module configured to match the data to be tested with a data rule determined on the basis of historical data, the historical data having the same data type as the data to be tested, the data rule containing an antecedent predicate set and a consequent predicate set, wherein the intersection of the antecedent predicate set and the consequent predicate set is an empty set, the antecedent predicate set contains at least one antecedent predicate, and the consequent predicate set contains at least one consequent predicate; and a determining module configured to, when the data to be tested satisfies all the antecedent predicates in the antecedent predicate set and fails to satisfy at least one consequent predicate in the consequent predicate set, determine that the data to be tested is anomalous due to failure to satisfy the data rule. Data anomalies may be detected accurately, and reasons for the occurrence of anomalies are interpretable.

In some embodiments, the matching module is configured to determine a global predicate set on the basis of the historical data; determine a predicate set of predicates in the global predicate set that the historical data conforms to; determine a closed frequent predicate set from the predicate set; divide the closed frequent predicate set into the antecedent predicate set and the consequent predicate set; group the antecedent predicate set and the consequent predicate set into the data rule. Use of historical data facilitates the determination of a data rule.

In some embodiments, the matching module is configured to randomly divide the closed frequent predicate set into a first set and a second set, wherein both the first set and the second set are non-empty sets; when the support of the first set is equal to the support of the closed frequent predicate set, the first set is determined as the antecedent predicate set and the second set is determined as the consequent predicate set. A support operation based on a division of a closed frequent predicate set facilitates the determination of an antecedent predicate set and a consequent predicate set.

In some embodiments, the matching module is configured to screen out the data rule that meets a constraint condition, the constraint condition being: $\sigma(S) > \max(\theta, \gamma^* \min(\sigma(p_1), \ldots, \sigma(p_{|S|})))$; $S_1$ is the antecedent predicate set; $S_2$ is the consequent predicate set; $S = S_1 \cup S_2$; $\{p_1, \ldots, p_{|S|}\}$ are the predicates in S; $\theta \in (0, \gamma)$; $\cup$ is a union operation; $\sigma$ is a support calculation; min is a minimisation operation; max is a maximisation operation; * is a multiplication operation; $\theta$ and $\gamma$ are preset coefficients. This may further ensure the statistical significance of a data rule.

In some embodiments, the historical data contain a discrete variable; the matching module is configured to generate corresponding candidate predicates on the basis of each possible value of the discrete variable; add a candidate predicate with support greater than or equal to a predetermined threshold to the global predicate set; add a candidate predicate with support less than the threshold to a temporary predicate set; add a combination predicate with support greater than or equal to the threshold among the combination predicates formed by an OR relationship between predicates in the temporary predicate set to the global predicate set. Predicates may be quickly and automatically generated for historical data containing discrete variables.

In some embodiments, the historical data contain a discrete variable and a continuous variable; the matching module is configured to generate corresponding candidate predicates on the basis of each possible value of the discrete variable; add a candidate predicate with support greater than or equal to a predetermined threshold to the global predicate set; add a candidate predicate with support less than the threshold to a temporary predicate set; add a combination predicate with support greater than or equal to the threshold among the combination predicates formed by an OR relationship between predicates in the temporary predicate set to the global predicate set; traverse the discrete variables, wherein a decision tree classification model is trained for the traversed discrete variables, the input variables in the decision tree classification model are all the continuous variables, and the output variables of the decision tree classification model are the traversed discrete variables; traverse the continuous variables, wherein a decision tree regression model is trained for the traversed continuous variables, wherein the input variables in the decision tree regression model are all the continuous variables other than the traversed continuous variables, and the output variables of the decision tree regression model are the traversed continuous variables; for each continuous variable, extract the cut-off values used by the non-leaf nodes of all the decision tree classification models and of all the decision tree regression models that are related to the continuous variable; for each continuous variable, sort the cut-off values of the extracted continuous variables; generate a predicate set for each continuous variable on the basis of the sorting results of each continuous variable; add a predicate set of all the continuous variables to the global predicate set. Predicates may be quickly and automatically generated for historical data containing discrete variables and continuous variables.

As another example, some embodiments include an electronic device, comprising: a processor; a memory for storing an executable instruction of the processor; a processor for reading the executable instruction from the memory and executing the executable instruction to implement one or more of the methods for detecting data anomalies as described herein.

As another example, some embodiments include a computer-readable storage medium on which a computer instruction is stored, wherein, when the computer instruction is executed by a processor, one or more of the methods for detecting data anomalies as described herein is implemented.

As another example, some embodiments include a computer program product, comprising a computer program that, when executed by a processor, implements one or more of the methods for detecting data anomalies as described herein.

BRIEF DESCRIPTION OF THE DRAWINGS

Example embodiments of the present disclosure are described in detail below with reference to the drawings, to give those skilled in the art a clearer understanding of the above-mentioned and other features and advantages thereof. In the figures.

The meanings of the reference numbers are as follows:

| Reference number | Meaning |
|---|---|
| 100 | Method for detecting data anomalies |
| 101-103 | Steps |
| 201-204 | Steps |
| 301-306 | Steps |
| 400 | Apparatus for detecting data anomalies |
| 401 | Receiving module |
| 402 | Matching module |
| 403 | Determining module |
| 500 | Electronic device |
| 501 | Processor |
| 502 | Memory |

DETAILED DESCRIPTION

To clarify the objective, technical solution and advantages of the teachings of the present disclosure, various example embodiments of the present disclosure are explained in further detail below. The solution offered by the present disclosure are expounded below by describing a number of representative embodiments, in order to make the description concise and intuitive. The large number of details in the embodiments are merely intended to assist with understanding of the solutions without limiting the scope of the disclosure. However, obviously, the technical solutions need not be limited to these details when implemented.

To avoid making the description unnecessarily obfuscated, some embodiments are not described meticulously, but merely outlined. Hereinbelow, "comprises" means "including but not limited to", while "according to . . . " means "at least according to . . . , but not limited to only according to . . . ". In line with the linguistic customs of Chinese, in cases where the quantity of a component is not specified hereinbelow, this means that there may be one or more of the component; this may also be interpreted as meaning at least one.

In some embodiments, highly interpretable anomaly detection is achieved by invariant rule mining of data. In some embodiments, there is a method for generating invariant data rules that, under normal conditions, need to be satisfied during the process of generating underlying data. Data rules generated by an embodiment of the present invention not only provides accurate anomaly detection, but also comprehensibly explains why specific data instances are detected as anomalies.

Firstly, some terms used will be explained below.

Predicate: A predicate further analyses a simple proposition, identifies the objects described and the relationships therebetween, and abstracts a general pattern for describing similar propositions. Generally, a pattern that characterises the characteristics of a single individual or the relationships between a plurality of individuals is called a predicate. A predicate may be simply described as an expression composed of a predicate symbol and several individual constants or arguments with a fixed order.

Support: Indicates the proportion of transactions containing both A and B to all transactions. If P(A) is used to represent the proportion of transactions using A, then Support=P(A&B).

Confidence: Refers to the proportion of transactions containing both A and B, namely the proportion of transactions containing both A and B to transactions containing A. It is expressed by formula: Confidence=P(A&B)/P(A).

Lift: Indicates the ratio of "the proportion of users using A who use B simultaneously" to "the proportion of users using B", so lift=(P(A&B)/P(A))/P(B). Lift reflects the correlation between A and B in an association rule, wherein when lift >1, the higher it is, the higher the positive correlation is, when lift <1, the lower it is, the higher the negative correlation is, and lift equal to 1 indicates no correlation.

Association rule: Indicates the probability of inferring another frequent itemset under the condition of one frequent itemset. If the confidence level of the association rule is greater than or equal to the minimum confidence level, it is a strong association rule.

Closed frequent itemset: When itemset X is a frequent itemset and there is no true superset Y of X in dataset D, so that the support of X and that of Y is equal, then X is a closed frequent itemset. The representation of a closed frequent itemset is lossless compression, in which no support information is lost. By using a closed frequent itemset, all the frequent itemsets and their corresponding support are derivable.

Figure 1:
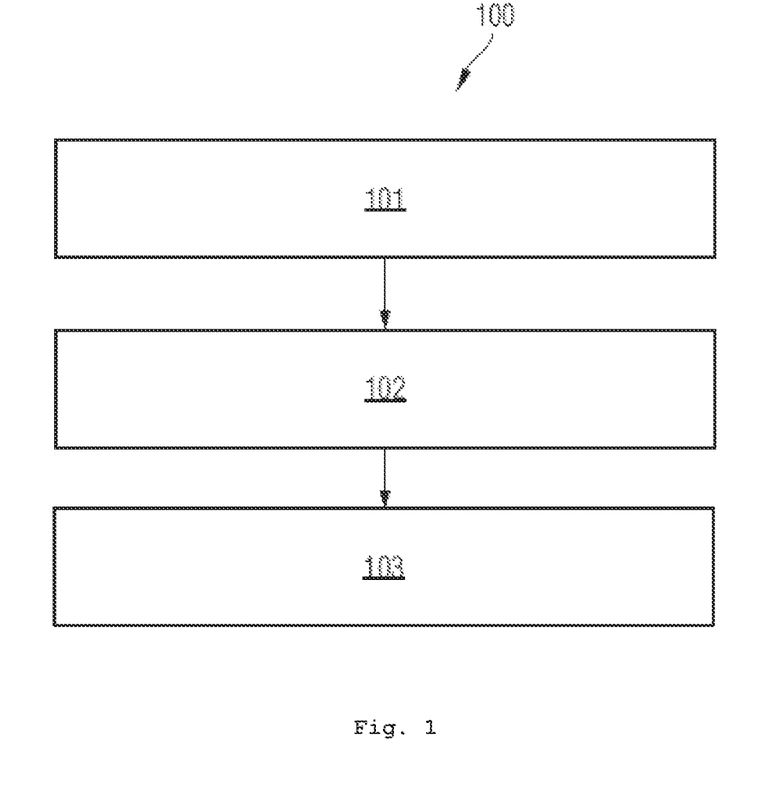
FIG. 1 is a flowchart of an example method for detecting data anomalies incorporating teachings of the present disclosure.

FIG. 1 is a flowchart of an example method for detecting data anomalies incorporating teachings of the present disclosure. As shown in FIG. 1, the method 100 comprises:

Step 101: Receive the data to be tested. Here, data to be tested is the data that needs to be detected to determine whether it contains any anomalies. For example, data to be tested may be various types of industrial data. Industrial data, for example, include:

(1) Business data related to enterprise operations, mainly sourced from the internal information management system of the enterprise, including Product Lifecycle Management (PLM), Enterprise Resource Planning (ERP), and Manufacturing Execution System (MES), Supplier Relationship Management (SCM) and Customer Relationship Management (CRM). Data such as products, processes, production, procurement, orders, and services is the core data assets of an enterprise, and it is mainly structured data, which, although having relatively small data volumes, has great mining value.

(2) Interconnection data of production line equipment, mainly referring to the operating conditions (such as pressure, temperature, vibration, and stress), operating statuses, environmental parameters, and other data of the production lines, equipment, and logistics during the production process, and it is generally collected from the equipment PLC, Supervisory Control And Data Acquisition (SCADA), and some external sensors. This type of data is mainly sequence data, with a large data volume and collected frequently.

(3) External data of an enterprise, including data related to operating conditions, operations, and maintenance of products delivered to users, as well as large amounts of data from the Internet, such as markets, circumstances, supply chains, online communities, and other external environments. Of it, product operation service data is mainly structured data, which can generate significant business value when integrated with internal business data of an enterprise.

The above exemplary description provides typical examples of data to be tested, and those skilled in the art may realise that this description is only exemplary, rather than being intended to limit the scope of protection of the present disclosure.

Step 102: Match the data to be tested with a data rule determined on the basis of historical data, the historical data having the same data type as the data to be tested, the data rule containing an antecedent predicate set and a consequent predicate set, wherein the intersection of the antecedent predicate set and the consequent predicate set is an empty set, the antecedent predicate set contains at least one antecedent predicate, and the consequent predicate set contains at least one consequent predicate.

An antecedent predicate and a consequent predicate may be implemented as constraints on the value range of variables in historical data, respectively. For example, data to be tested is real-time operation data of a factory. A data rule may be predetermined on the basis of historical operation data of the factory (for example, the historical operation data and the real-time operation data is collected from the same data source, and is of the same data type or kind). The data rule contains an antecedent predicate set and a consequent predicate set, wherein the intersection of the antecedent predicate set and the consequent predicate set is an empty set, the antecedent predicate set contains at least one antecedent predicate, and the consequent predicate set contains at least one consequent predicate.

One or more data rules may be determined on the basis of historical data. The data to be tested may be matched with each data rule separately. For each data rule, the matching results and meanings thereof include:

(1) When the data to be tested satisfies all the antecedent predicates in the antecedent predicate set and fails to satisfy at least one consequent predicate in the consequent predicate set (that is, failing to satisfy any one consequent predicate, or failing to satisfy a plurality of consequent predicates, or satisfying none of the consequent predicates), it is determined that the data rule is not satisfied, wherein, for example, if the data to be tested satisfies all the antecedent predicates in the antecedent predicate set but fails to satisfy a certain consequent predicate in the consequent predicate set, or fails to satisfy a plurality of consequent predicates in the consequent predicate set, or satisfies none of the consequent predicates in the consequent predicate set, it is determined that the data to be tested is anomalous and that the reason for the anomaly is failure to satisfy the data rule.

(2) When the data to be tested satisfy none of the antecedent predicates in the antecedent predicate set, the data rule is ignored. For example, when the data to be tested only satisfies some of the antecedent predicates in the antecedent predicate set or satisfies none of the antecedent predicates in the antecedent predicate set, the data rule is ignored.

(3) When the data to be tested satisfies all the antecedent predicates in the antecedent predicate set and all the consequent predicates in the consequent predicate set, it is determined that the data to be tested satisfies the data rule.

Step 103: When the data to be tested satisfies all the antecedent predicates in the antecedent predicate set and fails to satisfy at least one consequent predicate in the consequent predicate set, it is determined that the data to be tested is anomalous due to failure to satisfy the data rule. It is thus clear that by matching the data to be tested with a data rule, data anomalies may be accurately detected, and reasons for anomalies are interpretable. In other words, the reason for an anomaly is that the data to be tested fails to satisfy at least one consequent predicate in the consequent predicate set of the data rule. Preferably, specific consequent predicates that fail to be satisfied may be presented to the user.

In some embodiments, the method further comprises: determining a global predicate set on the basis of the historical data; determining a predicate set of predicates in the global predicate set that the historical data conforms to; determining a closed frequent predicate set from the predicate set; dividing the closed frequent predicate set into the antecedent predicate set and the consequent predicate set; grouping the antecedent predicate set and the consequent predicate set into the data rule.

For example, when historical data contains a plurality of data points (such as data points collected at a plurality of sampling times), first, a predicate set of predicates in the global predicate set that the historical data conforms to is determined; then, all the closed frequent predicate sets are mined from all the predicate subsets of all the data points; each closed frequent predicate set is divided into the antecedent predicate set and the consequent predicate set; the antecedent predicate set and the consequent predicate set are grouped into the data rule.

Here, frequent itemset mining is the foundation of many important data mining tasks, such as association rules, correlation analysis, causal relationships, sequence itemsets, local periodicity, and scenario fragments. Association rule mining is a two-step process: the first step is to identify all the frequent itemsets in the database that satisfy the minimum support threshold; the second step is to generate, from the frequent itemsets, all the association rules that satisfy the minimum confidence threshold. Since the overall performance of association rule mining is mainly determined by the performance of the first step, mining frequent itemsets holds the key to and presents the greatest difficulty in association rule mining. With the gradual development of association analysis technology, researchers have proposed a number of excellent algorithms for mining frequent itemsets, including single-machine mining algorithms, mining algorithms based on the Message Passing Interface (MPI), mining algorithms based on Map Reduce, and Spark-based mining algorithms.

In some embodiments, dividing a closed frequent predicate set into an antecedent predicate set and a consequent predicate set comprises: randomly dividing the closed frequent predicate set into a first set and a second set, wherein both the first set and the second set are non-empty sets; when the support of the first set is equal to the support of the closed frequent predicate set, the first set is determined as the antecedent predicate set and the second set is determined as the consequent predicate set.

For example, assume that historical data contains a plurality of data points collected at different times, namely data point D1, data point D2, data point D3, data point D4, and data point D5. The global predicate set determined on the basis of data points D1, D2, D3, D4, and D5 is S, $\{p_1, \ldots, p_5\}$ being the predicates in S. Discriminations are made between data point D1 and each predicate in S, and it is found that data point D1 conforms to $p_1, p_2, p_3$. Therefore, the predicate set for data point D1 is $\{p_1, p_2, p_3\}$. Discriminations are made between data point D2 and each predicate in S, and it is found that data point D2 conforms to $p_1, p_2, p_3, p_4$. Therefore, the predicate set for data point D2 is $\{p_1, p_2, p_3, p_4\}$. Discriminations are made between data point D3 and each predicate in S, and it is found that data point D3 conforms to $p_2, p_3, p_5$. Therefore, the predicate set for data point D3 is $\{p_2, p_3, p_5\}$. Discriminations are made between data point D4 and each predicate in S, and it is found that data point D4 conforms to $p_1, p_3, p_4, p_5$. Therefore, the predicate set for data point D4 is $\{p_1, p_3, p_4, p_5\}$. Discriminations are made between data point D5 and each predicate in S, and it is found that data point D5 conforms to $p_4, p_5$. Therefore, the predicate set for data point D5 is $\{p_4, p_5\}$. Assuming that the support threshold is set to 0.4, then on the basis of algorithms such as CFPgrowth or CFP-growth++, the set of closed frequent predicate sets is determined from the predicate sets of each data point as $\{(p_1, p_2, p_3)\}$, $\{(p_1, p_3)\}$, $\{(p_1, p_3, p_4)\}$, $\{(p_2, p_3)\}$, $\{(p_3, p_5)\}$, $\{(p_4, p_5)\}$. Each closed frequent predicate set is randomly divided into two subsets: a first subset and a second subset, wherein, when the support of the first set is equal to the support of the closed frequent predicate set, the first set is determined as the antecedent predicate set, and the second set is determined as the consequent predicate set. For example, closed frequent predicate set $\{(p_1, p_2, p_3)\}$ is divided into a first subset $\{(p_1, p_2)\}$ and a second subset $\{(p_3)\}$. When the support of the first subset $\{(p_1, p_2)\}$ (determined by the ratio of the number of data points in the historical data that satisfies the first subset to the total number of data points in the historical data) is equal to the support of the closed frequent predicate set $\{(p_1, p_2, p_3)\}$ (determined by the ratio of the number of data points in the historical data that satisfies the closed frequent predicate set $\{(p_1, p_2, p_3)\}$ to the total number of data points in the historical data), the data rule is determined to be $\{p_1, p_2\} \rightarrow \{p_3\}$, which means that when $p_1, p_2$ is satisfied, $p_3$ needs to be satisfied. Similarly, for closed frequent predicate set $\{(p_1, p_2, p_3)\}$, other data rules may also be determined. Similarly, data rules may be determined for other closed frequent predicate sets, respectively.

In some embodiments, the method further comprises screening out the data rule that meets a constraint condition, the constraint condition being: $\sigma(S) > \max(\theta, \gamma * \min(\sigma(p_1), \ldots, \sigma(p_{|S|})))$; $S_1$ is the antecedent predicate set; $S_2$ is the consequent predicate set; $S = S_1 \cup S_2$; $\{p_1, \ldots, p_{|S|}\}$ are the predicates in S; $\theta \in (0, \gamma)$; $\cup$ is a union operation; $\sigma$ is a support calculation; min is a minimisation operation; max is a maximisation operation; * is a multiplication operation; $\theta$ and $\gamma$ are preset coefficients. Then, the data to be tested is matched with the data rule screened out. When the data to be tested satisfies all the antecedent predicates in the antecedent predicate set of the data rule screened out and fails to satisfy at least one consequent predicate in the consequent predicate set of the data rule screened out, it is determined that the data to be tested is anomalous due to failure to satisfy the data rule screened out. Here, by screening data rules, the statistical significance of data rules is ensured.

In some embodiments, historical data contains a discrete variable; determining a global predicate set on the basis of the historical data comprises generating corresponding candidate predicates on the basis of each possible value of the discrete variable; adding a candidate predicate with support greater than or equal to a predetermined threshold to the global predicate set; adding a candidate predicate with support less than the threshold to a temporary predicate set; adding a combination predicate with support greater than or equal to the threshold among the combination predicates formed by an OR relationship between predicates in the temporary predicate set to the global predicate set. Predicates may be quickly and automatically generated for historical data containing discrete variables.

In some embodiments, historical data contains a discrete variable and a continuous variable; determining a predicate set on the basis of the historical data comprises generating corresponding candidate predicates on the basis of each possible value of the discrete variable; adding a candidate predicate with support greater than or equal to a predetermined threshold to the global predicate set; adding a candidate predicate with support less than the threshold to a temporary predicate set; adding a combination predicate with support greater than or equal to the threshold among the combination predicates formed by an OR relationship between predicates in the temporary predicate set to the global predicate set; traversing the discrete variables, wherein a decision tree classification model is trained for the traversed discrete variables, the input variables in the decision tree classification model are all the continuous variables, and the output variables of the decision tree classification model are the traversed discrete variables; traversing the continuous variables, wherein a decision tree regression model is trained for the traversed continuous variables, wherein the input variables in the decision tree regression model are all the continuous variables other than the traversed continuous variables, and the output variables of the decision tree regression model are the traversed continuous variables; for each continuous variable, extracting the cut-off values used by the non-leaf nodes of all the decision tree classification models and of all the decision tree regression models that are related to the continuous variable; for each continuous variable, sorting the cut-off values of the extracted continuous variables; generating a predicate set for each continuous variable on the basis of the sorting results of each continuous variable; adding a predicate set of all the continuous variables to the global predicate set. Predicates may be quickly and automatically generated for historical data containing discrete variables and continuous variables.

In some embodiments, firstly, a global predicate set is automatically generated from historical data, the global predicate set containing all the predicates generated on the basis of the historical data (for example, generating predicates by decision tree learning). Then, by association rule mining, an invariant data rule is automatically mined from historical data, the data rule containing an antecedent predicate set and a consequent predicate set, wherein the predicates in both the antecedent and consequent predicate sets are sourced from the global predicate set. The data to be tested is matched with the data rule. Matching results may include:

(1) When all the antecedent predicates in the antecedent predicate set are satisfied and all the consequent predicates in the consequent predicate set are satisfied, it is determined that the data to be tested conforms to the data rule.

(2) When some or all of the antecedent predicates in the current set fail to be satisfied, it is determined that the data to be tested fails to conform to the data rule.

(3) When all the antecedent predicates in the antecedent predicate set are satisfied and some or all of the consequent predicates in the consequent predicate set fail to be satisfied, it is determined that the data to be tested is anomalous due to failure to conform to the data rule.

A specific example algorithm is explained below:

Let X be an M-dimensional variable, where each dimension $X_i \in \Re$ is a continuous value, and let U be an N-dimensional variable, where each dimension $U_i \in \{1, \ldots, C\}$ is a discrete value. Consider the process of generating a multi-dimensional data instance stream $D=(d^1, d^2, \ldots, d^n)$, where each data point $d=x_1, \ldots, x_M, u_1, \ldots, u_N)$ is a vector composed of data instances of X and U, respectively.

In addition, it is assumed that there is a set of predicates $P=\{p_1, p_2, \ldots, p_k\}$ (where the method for generating the predicates will be detailed in later sections of embodiments of the present invention). For example, $5 \leq X_i < 10$ is a predicate for continuous variables and $U_i=0$ is a predicate for discrete variables. Each data point $d^i$ can satisfy a subset of predicates in P.

Further, the support of the predicate set S is represented by $\sigma(S)$, which indicates the fraction of data points that satisfy all the predicates in S.

Therefore, the invariant data rule is formally defined as follows:

$$S_1 \to S_2; \text{ in the formula } S_1 \subset P, S_2 \subset P,$$

$$S_1 \cap S_2 = \emptyset, \frac{\sigma(S_1 \cup S_2)}{\sigma(S_1)} = 1$$

In the formula, $S_1$ is the antecedent predicate set and $S_2$ is the consequent predicate set. This data rule means that as long as a data point satisfies all the antecedent predicates in the antecedent predicate set $S_1$, it must satisfy all the consequent predicates in the subsequent set $S_2$, otherwise the data point is considered anomalous. For example, the data rule may be as follows:

$$\{5 \leq X_1 < 10, X_2 > 20.4, U_1 = 0\} \to \{X_3 < 7.1, U_2 = 2\}$$

It may be noted that the data rule may be used for anomaly detection. Specifically, if all the predicates in the antecedent predicate set are satisfied but not all the predicates in the consequent predicate set are satisfied, the data point is reported as an anomaly. In addition, the data rule is self-explanatory.

In order to ensure the statistical significance of a data rule, the support of the data rule may be further required to be greater than a specific minimum support threshold of the data rule. Specifically, assuming that $S_1 \to S_2$ is an invariant data rule, $S=S_1 \cup S_2$, and $\{p_1, \ldots, p_{|S|}\}$ are all the predicates in S, then the following should be satisfied:

$$\sigma(S) > \max(\theta, \gamma \min(\sigma(p_1), \ldots, \sigma(p_{|S|})))$$

$\gamma \in (0, 1)$ and $\theta \in (0, \gamma)$, where $\gamma$ and $\theta$ are user-defined thresholds. Intuitively speaking, the above conditions mean that the support of the rule must be greater than the global threshold $\theta$ to achieve minimum statistical significance. In addition, it is irrational to set a unique minimum support threshold for all invariant rules, as the support of different predicates may vary significantly. Therefore, according to the anti-monotonic property (that the support of an itemset cannot exceed the support of a subset thereof), $\sigma(S) \leq \min(\sigma(p_1), \ldots, \sigma(p_{|S|}))$. Further, the support of a data rule is required to be greater than a specific upper bound thereof (scaled up and down by $\gamma$). It is notable that when the value of $\theta$ is greater than $\gamma$, it will result in a unique minimum support threshold for all rules, so $\theta \in (0, \gamma)_\circ$ is required.

Given a dataset D and a predicate set P, how to mine such invariant rules is a problem closely investigated in association rule mining. For example, algorithms such as CFP-growth and CFP growth++ may be used to first identify all the closed frequent itemsets with a plurality of minimum support thresholds from the dataset. Then, a random closed frequent itemset S is divided into two non-empty sets: $S_1$ and $(S-S_1)$, wherein, if the confidence level of the data rule $S_1 \to (S-S_1)$ is 100%, namely $$\frac{\sigma(S)}{\sigma(S_1)} = 1,$$

the data rule $S_1 \to (S-S_1)$ is generated.

The process of generating a global predicate set on the basis of historical data will be described below.

The quality of generating the global predicate set P is crucial. Specifically, the quality of generated predicates is considered from three aspects: (1) The generated predicates should have a high probability of generating invariant data rules. (2) The form of generating predicates should be as simple as possible to maximise the interpretability of invariant data rules. (3) The generated predicate should not result in any self-evident invariant data rules.

It is worth noting that if a data rule is inviolable without observing a dataset, then the data rule is self-evident. For example, $\{X\_1<5\} \to \{X\_1<10\}$ is obviously a self-evident data rule. In addition, given the user-defined minimum support thresholds $\gamma$ and $\theta$, for any generated predicate p, $\sigma(p) \geq \theta$ is required. It is readily discernible that if the support of predicate p is less than $\theta$, any data rule containing p fails to meet the minimum support condition.

Figure 2:
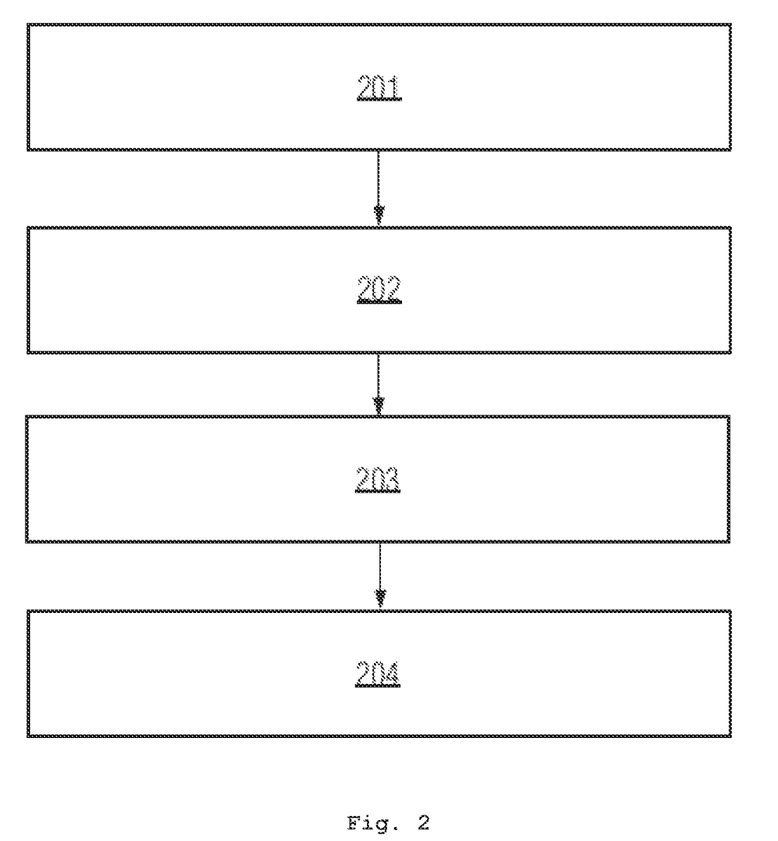
FIG. 2 is a flowchart of an example method for generating a global predicate set from historical data containing discrete variables incorporating teachings of the present disclosure.

(1) When historical data contains discrete variables and contain no continuous variables:

FIG. 2 is a flowchart of an example method for generating an global predicate set from historical data containing discrete variables incorporating teachings of the present disclosure. As shown in FIG. 2, the method for generating an global predicate set from historical data containing discrete variables comprises:

Step 201: Generate corresponding candidate predicates on the basis of each possible value of the discrete variables.

Step 202: Add candidate predicates with support greater than or equal to a predetermined threshold to the global predicate set.

Step 203: Add candidate predicates with support less than the threshold to a temporary predicate set.

Step 204: Add a combination predicate with support greater than or equal to the threshold among the combination predicates formed by an "OR" relationship between predicates in the temporary predicate set to the global predicate set.

For example, assume that historical data contains discrete variables a, b, and c. Possible values of discrete variable a are 1, 2, and 3; possible values of discrete variable b are 4, 5, and 6; possible values of discrete variable c are 6, 7, and 8.

Firstly, for discrete variable a, candidate predicate 1: discrete variable a=1; candidate predicate 2: discrete variable a=2; candidate predicate 3: discrete variable a=3 are generated. For discrete variable b, candidate predicate 4: discrete variable b=4; candidate predicate 5: discrete variable b=5; candidate predicate 6: discrete variable b=6 are generated. For discrete variable c, candidate predicate 7: discrete variable b=6; candidate predicate 8: discrete variable b=7; candidate predicate 9: discrete variable b=8 are generated.

Then, candidate predicates with support greater than or equal to a threshold (for example, a threshold of θ) among candidate predicates 1 to 9 are added to the global predicate set, and candidate predicates with support less than a threshold (for example, a threshold of θ) among candidate predicates 1 to 9 are added to the temporary predicate set. For example, suppose candidate predicates 1 to 6 are added to the global predicate set, while candidate predicates 7 to 9 are added to the temporary predicate set.

Then, in the temporary predicate set, combination predicates are formed with the OR relationship, and combination predicates with support greater than or equal to the threshold are added to the global predicate set. For example, combination predicate 1: candidate predicate 7 (discrete variable b=6) or candidate predicate 8 (discrete variable b=7); combination predicate 2: candidate predicate 7 (discrete variable b=6) or candidate predicate 9 (discrete variable b=8); combination predicate 3: candidate predicate 8 (discrete variable b=7) or candidate predicate 9 (discrete variable b=8); combination predicate 4: candidate predicate 7 (discrete variable b=6) or candidate predicate 8 (discrete variable b=7) or candidate predicate 9 (discrete variable b=8) may be formed. Then, the support of each combination predicate among combination predicates 1-4 is calculated, and the combination predicates with support greater than the threshold are added to the global predicate set.

The process shown in FIG. 2 may be implemented in various manners. For example, on the basis of automatic execution logic (for example, a computer program), the process shown in FIG. 2 is implemented in order of reference number. For example, suppose P is the global predicate set and $\tilde{P}$ is the temporary predicate set. The specific implementation logic may comprise:

Reference number 1: Assign an empty set to P(P←Ø) and assign an empty set to $\tilde{P}$($\tilde{P}$←Ø);
Reference number 2: The number of discrete variables in historical data is N, and for each discrete variable $U_i$ (i=1, 2, . . . , N), the traversal is performed:
Reference number 3: Determine 1, . . . , C as possible values of $U_i$
Reference number 4: For c=1, . . . , C, perform traversal:
Reference number 5: Generate predicates p: $U_i$=c
Reference number 6: If σ(p)≥θ, then
Reference number 7: Add p to P
Reference number 8: Otherwise
Reference number 9: Add p to $\tilde{P}$
Reference number 10: End IF
Reference number 11: End traversal
Reference number 12: End traversal
Reference number 13: Set $\tilde{P}$={$p_1$, . . . , $p_J$}
Reference number 14: Assign 1 to k (k←1)
Reference number 15: For j, j=2, . . . , J, perform the traversal:
Reference number 16: If σ($p_k$| . . . |$p_j$)>θ, then
Reference number 17: If σ($p_{j+1}$| . . . |$p_J$)>θ, then
Reference number 18: Generate predicates p: $p_k$| . . . |$p_j$
Reference number 19: Add p to P
Reference number 20: Assign j+1 to k (k←j+1)
Reference number 21: Otherwise
Reference number 22: Generate predicates p: $p_k$| . . . |$p_J$
Reference number 23: Add p to P
Reference number 24: Interrupt
Reference number 25: End IF Reference number 26: End IF
Reference number 27: End traversal
Reference number 28: Return to P.

(2) When the historical data contains discrete variables and continuous variables, a global predicate set may be generated for the discrete variables in the historical data on the basis of the logic shown in FIG. 2. The specific process of generating a global predicate set for discrete variables comprises: generating corresponding candidate predicates on the basis of each possible value of the discrete variable; adding a candidate predicate with support greater than or equal to a predetermined threshold to the global predicate set; adding a candidate predicate with support less than the threshold to a temporary predicate set; adding a combination predicate with support greater than or equal to the threshold among the combination predicates formed by an "OR" relationship between predicates in the temporary predicate set to the global predicate set.

Moreover, predicates generated on the basis of continuous variables in the historical data are added to the global predicate set. For continuous variables, predicates are generated by the steps of: (1) generating a set of cut-off values for each continuous variable by learning a decision tree model, in order to predict the value of the continuous variable as the target through all the continuous variables other than the continuous variable as the target; (2) generating predicates for all the continuous variables on the basis of the cut-off values.

Figure 3:
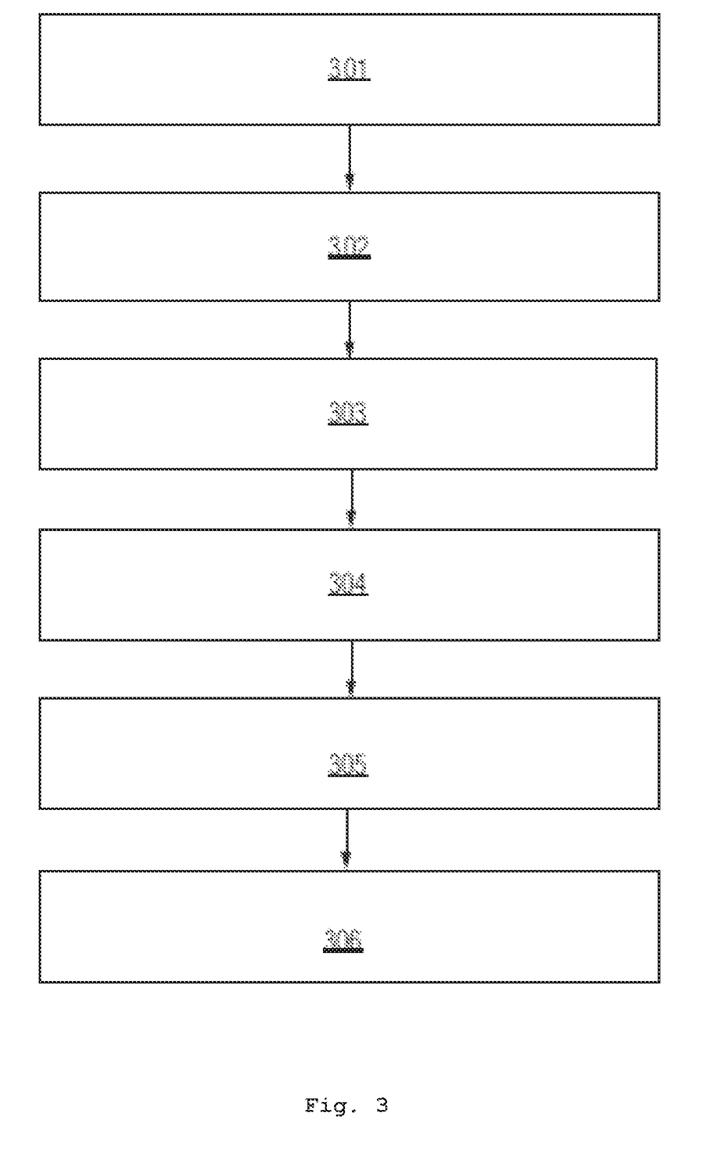
FIG. 3 is a flowchart of an example method for generating an global predicate set from historical data containing discrete variables and continuous variables incorporating teachings of the present disclosure.

FIG. 3 is a flowchart of an example method for generating an global predicate set from historical data containing discrete variables and continuous variables according to an embodiment of the present invention. As shown in FIG. 3, for continuous variables, a method for generating predicates comprises:

Step 301: Traverse the discrete variables, wherein a decision tree classification model is trained for the traversed discrete variables, the input variables in the decision tree classification model are all the continuous variables, and the output variables of the decision tree classification model are the traversed discrete variables.

Step 302: Traverse the continuous variables, wherein a decision tree regression model is trained for the traversed continuous variables, wherein the input variables in the decision tree regression model are all the continuous variables other than the traversed continuous variables, and the output variables of the decision tree regression model are the traversed continuous variables.

Step 303: For each continuous variable, extract the cut-off values used by the non-leaf nodes of all the decision tree classification models and of all the decision tree regression models that are related to the continuous variable.

Step 304: For each continuous variable, sort the cut-off values of the extracted continuous variables.

Step 305: Generate a predicate set for each continuous variable on the basis of the sorting results of each continuous variable.

Step 306: Add a predicate set of all the continuous variables to the global predicate set.

The process shown in FIG. 3 may be implemented in various manners. For example, on the basis of automatic execution logic (for example, a computer program), the process shown in FIG. 3 is implemented in order of reference number.

Required inputs include: Dataset D, θ;
Reference number 1: P←Ø, T←Ø, where ← means assigning a value, and Ø is an empty set Reference number 2: Traverse each discrete variable i in historical data containing N discrete variables, i=1, 2, . . . , N, execution:

Reference number 3: Train a decision tree classification model $DT(X) \rightarrow U_i$ Reference number 4: For each internal node j in the trained decision tree model, add $(X_j, \tau_j)$ to T Reference number 5: End traversal Reference number 6: Traverse each continuous variable i in historical data containing M continuous variables, i=1, 2, . . . , M, execution:

Reference number 7: Train a decision tree regression model $DT(X_{-i}) \rightarrow X_i$ Reference number 8: For each internal node j in the trained decision tree model, add $(X_j, \tau_j)$ to T Reference number 9: End traversal Reference number 10: Traverse i, where i=1, 2, . . . , M, execution:

Reference number 11: Get $X_i:(\tau_1, \ldots, \tau_J)$ from T, wherein $\tau_1 < \ldots < \tau_J$ Reference number 12: $k \leftarrow 0$ Reference number 13: Traverse j, where j=1, . . . , J, execution:

Reference number 14: If k=0 and $\sigma(X_i < \tau_j) > \theta$, then

Reference number 15: Generate predicates p: $X_i < \tau_j$

Reference number 16: Add p to P

Reference number 17: $k \leftarrow j$

Reference number 18: End IF

Reference number 19: If k>0 and $\sigma(\tau_k \leq X_i < \tau_j) > \theta$, then Reference number 20: If $\sigma(X_i \geq \tau_j) > \theta$, then Reference number 21: Generate predicates p: $\tau_k \leq X_i < \tau_j$ Reference number 22: Add p to P Reference number 23: $k \leftarrow j$ Reference number 24: Otherwise Reference number 25: Generate predicates p: $X_i \geq \tau_k$ Reference number 26: Add p to P Reference number 27: Interrupt Reference number 28: End IF Reference number 29: End IF Reference number 30: If j=J, then Reference number 31: Generate predicates p: $X_i \geq \tau_k$ Reference number 32: Add p to P Reference number 33: End IF Reference number 34: End traversal Reference number 35: End traversal Reference number 36: Return to P.

Teachings of the present disclosure are applicable to various application scenarios of data anomaly detection. For example, an embodiment was applied to mining invariant data rules from datasets collected from a water treatment system. The data consisted of values from 24 sensors and 27 actuators, sampled for 11 days. The system operated under normal conditions for the first 7 days, and entered 36 different types of anomalous operating modes in the remaining 4 days. Data rules were mined from the data for the previous 7 days, and the mined rules were used to perform anomaly detection on the data for the last 4 days. After $\theta=0.05$, $\gamma=0.7$ was set, 311 invariant rules were successfully mined from the data.

Some typical examples of data rules are as follows:

Rule 1: DPIT301<2.226454496383667⊖MV302=1;

Rule 2: PIT503<186.61080169677734→FIT503<0.7354607284069061;

Rule 3: FIT501>=1.7409000396728516→AIT401>=0.06969364732503891.

It is clear that these rules are readily comprehensible to system operators.

Table 1 is a schematic comparison between an embodiment of the present invention and isolation forest.

TABLE 1

|  | Embodiment of the present invention | Isolation forest |
| --- | --- | --- |
| Precision | 0.78 | 0.27 |
| Recall | 0.51 | 0.79 |
| F1 score | 0.62 | 0.41 |

It is clear that compared with isolation forest, this makes it possible to achieve a higher F1 score (which is the most commonly used measure for evaluating anomaly detection performance).

Figure 4:
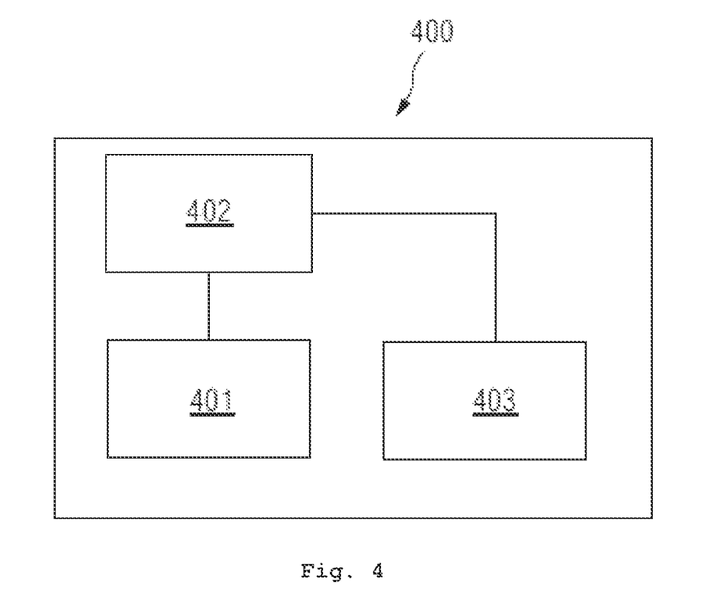
FIG. 4 is a structural diagram of an example apparatus for detecting data anomalies incorporating teachings of the present disclosure.

FIG. 4 is a structural diagram of an example apparatus for detecting data anomalies incorporating teachings of the present disclosure. As shown in FIG. 4, the apparatus 400 for detecting data anomalies comprises:

a receiving module 401 configured to receive data to be tested;

a matching module 402 configured to match the data to be tested with a data rule determined on the basis of historical data, the historical data having the same data type as the data to be tested, the data rule containing an antecedent predicate set and a consequent predicate set, wherein the intersection of the antecedent predicate set and the consequent predicate set is an empty set, the antecedent predicate set contains at least one antecedent predicate, and the consequent predicate set contains at least one consequent predicate; and a determining module 403 configured to, when the data to be tested satisfies all the antecedent predicates in the antecedent predicate set and fails to satisfy at least one consequent predicate in the consequent predicate set, determine that the data to be tested is anomalous due to failure to satisfy the data rule.

In some embodiments, the matching module 402 is configured to determine a global predicate set on the basis of historical data; determine a predicate set of predicates in the global predicate set that the historical data conforms to; determine a closed frequent predicate set from the predicate set; divide the closed frequent predicate set into the antecedent predicate set and the consequent predicate set; group the antecedent predicate set and the consequent predicate set into the data rule.

In some embodiments, the matching module 402 is configured to randomly divide a closed frequent predicate set into a first set and a second set, wherein both the first set and the second set are non-empty sets; when the support of the first set is equal to the support of the closed frequent predicate set, the first set is determined to be the antecedent predicate set and the second set is determined to be the consequent predicate set.

In some embodiments, the matching module 402 is configured to screen out a data rule that meets a constraint condition, the constraint condition being $\sigma(S) > \max(\theta, \gamma^* \min(\sigma(p_1), \ldots, \sigma(p_{|S|})))$: $S_1$ is the antecedent predicate set; $S_2$ is the consequent predicate set; $S = S_1 \cup S_2$; $\{p_1, \ldots, p_{|S|}\}$ are the predicates in S; $\theta \in (0, \gamma)$; $\cup$ is a union operation; $\sigma$ is a support calculation; min is a minimisation operation; max is a maximisation operation; * is a multiplication operation; $\theta$ and $\gamma$ are preset coefficients.

In some embodiments, historical data contain a discrete variable; the matching module 402 is configured to generate corresponding candidate predicates on the basis of each possible value of the discrete variable; add a candidate predicate with support greater than or equal to a predetermined threshold to the global predicate set; add a candidate predicate with support less than the threshold to a temporary predicate set; add a combination predicate with support greater than or equal to the threshold among the combination predicates formed by an OR relationship between predicates in the temporary predicate set to the global predicate set.

In some embodiments, historical data contain a discrete variable and a continuous variable; the matching module 402 is configured to generate corresponding candidate predicates on the basis of each possible value of the discrete variable; add a candidate predicate with support greater than or equal to a predetermined threshold to the global predicate set; add a candidate predicate with support less than the threshold to a temporary predicate set; add a combination predicate with support greater than or equal to the threshold among the combination predicates formed by an OR relationship between predicates in the temporary predicate set to the global predicate set; traverse the discrete variables, wherein a decision tree classification model is trained for the traversed discrete variables, the input variables in the decision tree classification model are all the continuous variables, and the output variables of the decision tree classification model are the traversed discrete variables; traverse the continuous variables, wherein a decision tree regression model is trained for the traversed continuous variables, wherein the input variables in the decision tree regression model are all the continuous variables other than the traversed continuous variables, and the output variables of the decision tree regression model are the traversed continuous variables; for each continuous variable, extract the cut-off values used by the non-leaf nodes of all the decision tree classification models and of all the decision tree regression models that are related to the continuous variable; for each continuous variable, sort the cut-off values of the extracted continuous variables; generate a predicate set for each continuous variable on the basis of the sorting results of each continuous variable; and add a predicate set of all the continuous variables to the global predicate set.

Figure 5:
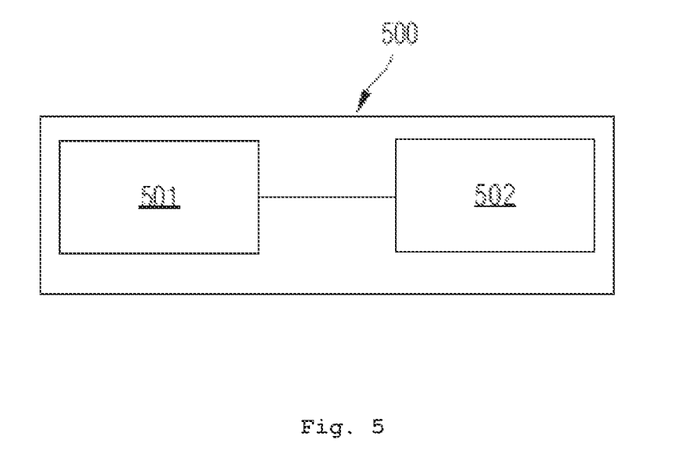
FIG. 5 is a structural diagram of an example electronic device incorporating teachings of the present disclosure.

As another example, some embodiments include an electronic device with a processor-memory architecture. FIG. 5 is a structural diagram of an example electronic device incorporating teachings of the present disclosure. As shown in FIG. 5, the electronic device 500 comprises a processor 501, a memory 502, and a computer program stored in the memory 502 that can run on the processor 501, wherein, when the computer program is executed by the processor 501, a method for detecting data anomalies as described above is implemented. The memory 502 may specifically be implemented as various types of storage media, such as an electrically erasable programmable read-only memory (EEPROM), a flash memory or a programmable read-only memory (PROM). The processor 501 may be implemented as comprising one or more central processors or one or more field-programmable gate arrays, wherein the field-programmable gate array integrates one or more central processor cores. Specifically, central processors or central processor cores may be implemented as CPUs, or MCUs, or DSPs, and so on.

It must be explained that not all of the steps and modules in the flows and structural diagrams above are necessary; certain steps or modules may be omitted according to actual requirements. The sequence in which the steps are executed is not fixed, but may be adjusted as needed. The partitioning of the modules is merely functional partitioning, employed for the purpose of facilitating description; during actual implementation, one module may be realized by multiple modules, and the functions of multiple modules may be realized by the same module; these modules may be located in the same device, or in different devices.

Hardware modules in the embodiments may be realized mechanically or electronically. For example, one hardware module may comprise a specially designed permanent circuit or logic device (such as a dedicated processor, such as an FPGA or ASIC) for completing a specific operation. The hardware module may also comprise a programmable logic device or circuit that is temporarily configured by software (e.g. comprising a general processor or another programmable processor) for executing a specific operation. The choice of whether to specifically use a mechanical method, or a dedicated permanent circuit, or a temporarily configured circuit (e.g. configured by software) to realize the hardware module can be decided according to considerations of cost and time.

The embodiments above are merely example embodiments of the teachings of the present disclosure, and are not intended to define the scope of protection thereof. Any amendments, equivalent substitutions or improvements etc. made within the spirit and principles of the present disclosure shall be included in the scope of protection thereof.

The invention claimed is:

1. A method for training a computing system to detect data anomalies in a water treatment system, the method comprising:
   receiving test data from the water treatment system into the computing system;
   matching the test data with a data rule determined on the basis of historical data having a shared data type with the test data using a processor of the computing system, the historical data representing a normal operation mode of the water treatment system and at least two different anomalous operating modes, the data rule stored in a memory of the computing system and containing an antecedent predicate set and a consequent predicate set, wherein an intersection of the antecedent predicate set and the consequent predicate set is an empty set, the antecedent predicate set contains at least one antecedent predicate, and the consequent predicate set contains at least one consequent predicate;
   determining a global predicate set on the basis of the historical data using the processor;
   determining a predicate set of predicates in the global predicate set that the historical data conforms to using the processor;
   determining a closed frequent predicate set from the predicate set using the processor;
   dividing the closed frequent predicate set into the antecedent predicate set and the consequent predicate set using the processor;
   grouping the antecedent predicate set and the consequent predicate set into the data rule using the processor; and
   when the data to be tested satisfies all the antecedent predicates in the antecedent predicate set and fails to satisfy at least one consequent predicate in the consequent predicate set, flagging the test data as anomalous due to failure to satisfy the data rule using the processor;
   wherein dividing the closed frequent predicate set into the antecedent predicate set and the consequent predicate set comprises:
   randomly dividing the closed frequent predicate set into a first set and a second set, wherein both the first set and the second set are non-empty sets; and when the support for the first set is equal to the support for the closed frequent predicate set, determining the first set to be the antecedent predicate set and determining the second set to be the consequent predicate set.

2. A method according to claim 1, further comprising screening out the data rule that meets a constraint condition, the constraint condition being $\sigma(S) > \max_{fo}(\theta, \gamma * \min_{fo}(\sigma(p\_1), \ldots, \sigma(p\_(|S|))))$;

wherein S_1 is the antecedent predicate set; S_2 is the consequent predicate set; $S = S\_1 \cup S\_2$; {p_1, ..., p_(|S|)} are the predicates in S; $\theta \in (0, \gamma)$; ∪ is a union operation; σ is a support calculation; min is a minimisation operation; max is a maximisation operation; * is a multiplication operation; θ and γ are preset coefficients.

3. A method according to claim 1, wherein:
the historical data contains a discrete variable; and
determining a global predicate set on the basis of historical data comprises:
generating corresponding candidate predicates on the basis of each possible value of the discrete variable;
adding a candidate predicate with support greater than or equal to a predetermined threshold to the global predicate set;
adding a candidate predicate with support less than the threshold to a temporary predicate set; and
adding a combination predicate with support greater than or equal to the threshold among the combination predicates formed by an OR relationship between predicates in the temporary predicate set to the global predicate set.

4. A method according to claim 1, wherein:
the historical data contain a discrete variable and a continuous variable; and
determining of a global predicate set on the basis of historical data comprises:
generating corresponding candidate predicates on the basis of each possible value of the discrete variable;
adding a candidate predicate with support greater than or equal to a predetermined threshold to the global predicate set;
adding a candidate predicate with support less than the threshold to a temporary predicate set;
adding a combination predicate with support greater than or equal to the threshold among the combination predicates formed by an OR relationship between predicates in the temporary predicate set to the global predicate set;
traversing the discrete variables, wherein a decision tree classification model is trained for the traversed discrete variables, the input variables in the decision tree classification model are all the continuous variables, and the output variables of the decision tree classification model are the traversed discrete variables;
traversing the continuous variables, wherein a decision tree regression model is trained for the traversed continuous variables, wherein the input variables in the decision tree regression model are all the continuous variables other than the traversed continuous variables, and the output variables of the decision tree regression model are the traversed continuous variables;
for each continuous variable, extracting the cut-off values used by the non-leaf nodes of all the decision tree classification models and of all the decision tree regression models that are related to the continuous variable;
for each continuous variable, sorting the cut-off values of the extracted continuous variables;
generating a predicate set for each continuous variable on the basis of the sorting results of each continuous variable; and
adding a predicate set of all the continuous variables to the global predicate set.

5. An apparatus for detecting data anomalies in operating data of a water treatment system, the apparatus comprising:
a receiving module to receive test data from the water treatment system into the computing system;
a matching module:
to match the test data with a data rule determined on the basis of historical data, the historical data having a shared data type with the test data, the historical data representing a normal operation mode of the water treatment system and at least two different anomalous operating modes the data rule containing an antecedent predicate set and a consequent predicate set, wherein the intersection of the antecedent predicate set and the consequent predicate set is an empty set, the antecedent predicate set contains at least one antecedent predicate, and the consequent predicate set contains at least one consequent predicate;
to determine a global predicate set on the basis of the historical data;
to determine a predicate set of predicates in the global predicate set that the historical data conforms to;
to determine a closed frequent predicate set from the predicate set;
to divide the closed frequent predicate set into the antecedent predicate set and the consequent predicate set; and
to group the antecedent predicate set and the consequent predicate set into the data rule; and
a determining module to, when the data to be tested satisfies all the antecedent predicates in the antecedent predicate set and fails to satisfy at least one consequent predicate in the consequent predicate set, flag the test data as anomalous due to failure to satisfy the data rule;
wherein dividing the closed frequent predicate set into the antecedent predicate set and the consequent predicate set comprises:
randomly dividing the closed frequent predicate set into a first set and a second set, wherein both the first set and the second set are non-empty sets; and
when the support for the first set is equal to the support for the closed frequent predicate set, determining the first set to be the antecedent predicate set and determining the second set to be the consequent predicate set.

6. An apparatus according to claim 5, wherein the matching module is further configured to screen out the data rule that meets a constraint condition, the constraint condition being $\sigma(S) > \max_{fo}(\theta, \gamma * \min_{fo}(\sigma(p\_1), \ldots, \sigma(p\_(|S|))))$; S_1 is the antecedent predicate set; S_2 is the consequent predicate set; $S = S\_1 \cup S\_2$; {p_1, ..., p_(|S|)} are the predicates in S; $\theta \in (0, \gamma)$; ∪ is a union operation; σ is a support calculation; min is a minimisation operation; max is a maximisation operation; * is a multiplication operation; θ and γ are preset coefficients.

7. An apparatus according to claim 5, wherein the historical data contain a discrete variable; and
the matching module is configured to generate corresponding candidate predicates on the basis of each possible value of the discrete variable; add a candidate predicate with support greater than or equal to a predetermined threshold to the global predicate set; add a candidate predicate with support less than the threshold to a temporary predicate set; and add a combination predicate with support greater than or equal to the threshold among the combination predicates formed by an OR relationship between predicates in the temporary predicate set to the global predicate set.

8. An apparatus according to claim 5, wherein the historical data contains discrete variables and continuous variables; and the matching module is configured to generate corresponding candidate predicates on the basis of each possible value of the discrete variable; add a candidate predicate with support greater than or equal to a predetermined threshold to the global predicate set; add a candidate predicate with support less than the threshold to a temporary predicate set; add a combination predicate with support greater than or equal to the threshold among the combination predicates formed by an OR relationship between predicates in the temporary predicate set to the global predicate set; traverse the discrete variables, wherein a decision tree classification model is trained for the traversed discrete variables, the input variables in the decision tree classification model are all the continuous variables, and the output variables of the decision tree classification model are the traversed discrete variables; traverse the continuous variables, wherein a decision tree regression model is trained for the traversed continuous variables, wherein the input variables in the decision tree regression model are all the continuous variables other than the traversed continuous variables, and the output variables of the decision tree regression model are the traversed continuous variables; for each continuous variable, extract the cut-off values used by the non-leaf nodes of all the decision tree classification models and of all the decision tree regression models that are related to the continuous variable; for each continuous variable, sort the cut-off values of the extracted continuous variables; generate a predicate set for each continuous variable on the basis of the sorting results of each continuous variable; add a predicate set of all the continuous variables to the global predicate set.

9. A device comprising:
a processor;
a memory storing an executable instruction for the processor;
wherein the processor is configured to read the executable instruction from the memory and execute the executable instruction to:
receive test data from a water treatment system;
match the test data with a data rule determined on the basis of historical data having a shared data type with the test data, the historical data representing a normal operation mode of the water treatment system and at least two different anomalous operating modes, the data rule containing an antecedent predicate set and a consequent predicate set, wherein an intersection of the antecedent predicate set and the consequent predicate set is an empty set, the antecedent predicate set contains at least one antecedent predicate, and the consequent predicate set contains at least one consequent predicate;
determine a global predicate set on the basis of the historical data;
determine a predicate set of predicates in the global predicate set that the historical data conforms to;
determine a closed frequent predicate set from the predicate set;
divide the closed frequent predicate set into the antecedent predicate set and the consequent predicate set; and
group the antecedent predicate set and the consequent predicate set into the data rule; and
when the data to be tested satisfies all the antecedent predicates in the antecedent predicate set and fails to satisfy at least one consequent predicate in the consequent predicate set, flag the test data as anomalous due to failure to satisfy the data rule;
wherein dividing the closed frequent predicate set into the antecedent predicate set and the consequent predicate set comprises:
randomly dividing the closed frequent predicate set into a first set and a second set, wherein both the first set and the second set are non-empty sets; and
when the support for the first set is equal to the support for the closed frequent predicate set, determining the first set to be the antecedent predicate set and determining the second set to be the consequent predicate set.

* * * * *